Figure 1:
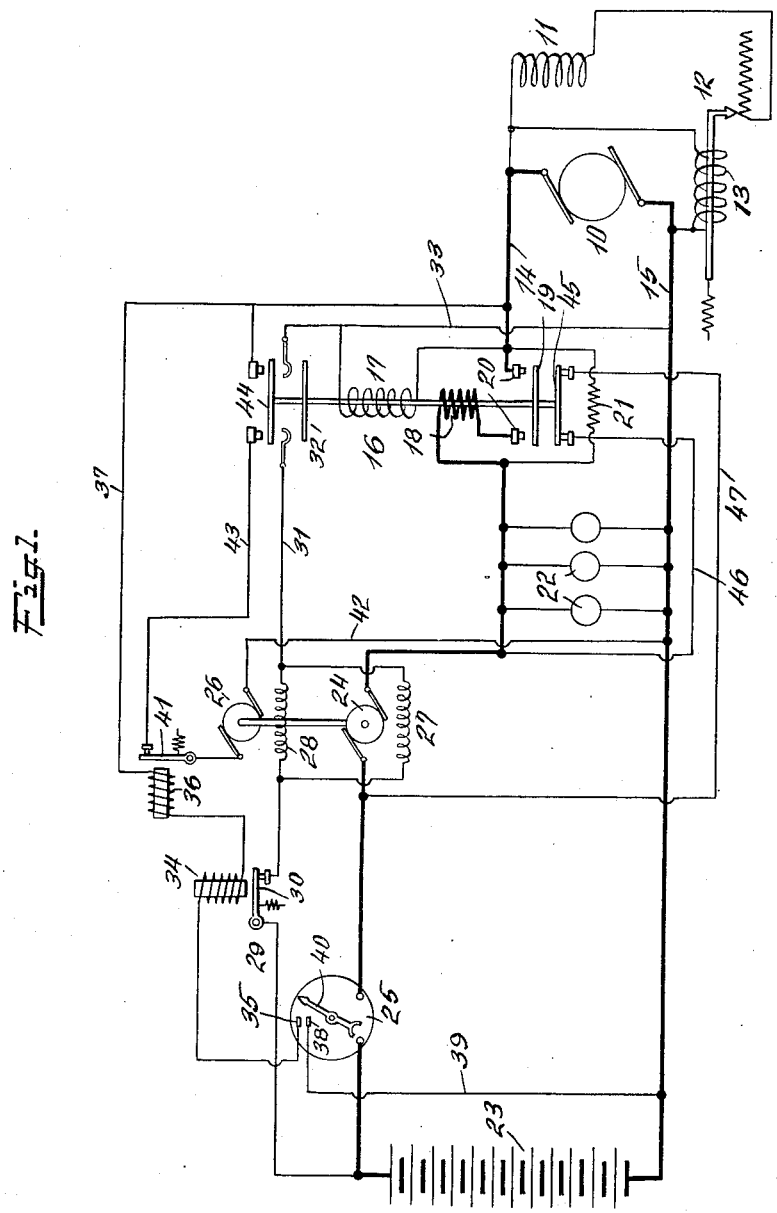

M. ARENDT.
LIGHTING VEHICLES.
APPLICATION FILED APR. 25, 1917.

1,366,629.

Patented Jan. 25, 1921.
2 SHEETS—SHEET 1.

Inventor
Morton Arendt.
By his Attorneys
Pennie, Davis, Marvin & Edmonds

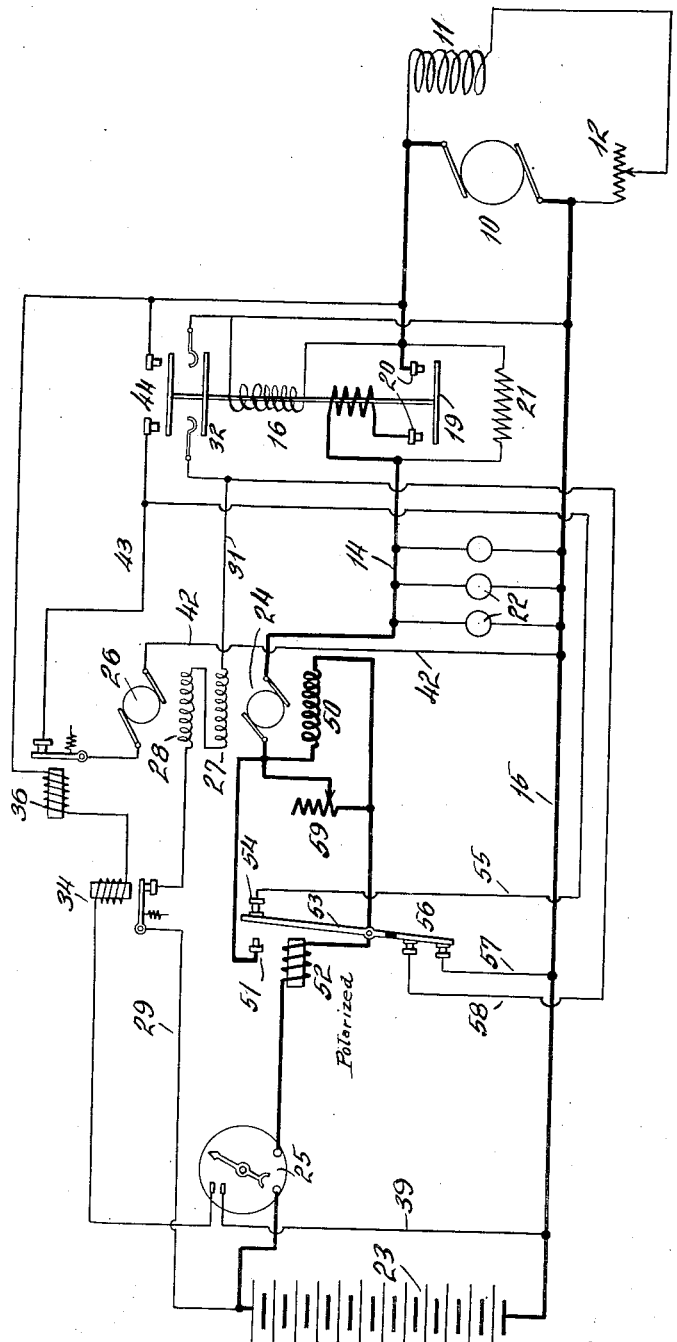

UNITED STATES PATENT OFFICE.

MORTON ARENDT, OF NEW YORK, N. Y., ASSIGNOR, BY MESNE ASSIGNMENTS, TO ELECTRO DYNAMIC COMPANY, A CORPORATION OF NEW JERSEY.

LIGHTING VEHICLES.

1,366,629.    Specification of Letters Patent.    Patented Jan. 25, 1921.

Application filed April 25, 1917. Serial No. 164,315.

*To all whom it may concern:*

Be it known that I, MORTON ARENDT, a citizen of the United States, residing at New York, borough of Manhattan, in the county of New York, State of New York, have invented certain new and useful Improvements in Lighting Vehicles; and I do hereby declare the following to be a full, clear, and exact description of the invention, such as will enable others skilled in the art to which it appertains, to make and use the same.

The present invention relates to electric lighting and battery charging systems and especially to a system adapted for use in train lighting where the generator is subject to wide variations in speed and the battery is depended upon at various times to carry the lamp load.

The problem of storage battery charging on lighting circuits especially involves several contradictory features. Storage batteries, to accomplish the best results, require charging at a constant rate for definite periods of time, during which the voltage at the terminals of the battery rises with a particularly marked increase at the end of the charge. Any lamps that may be connected to the battery require, however, for economy and full life, that the current be supplied to them at substantially constant potential. These requirements of the battery and the lamps have usually been met in the past by charging the battery from a generator regulated to supply constant current independently of the train speed and maintaining the potential of the lamp circuit substantially constant by the action of a regulator which varies the resistance in series in the lamp circuit so as to increase the potential drop in the circuit when the voltage at the lamps would be too high and to decrease this drop when the voltage of the lamp circuits would tend to be too low. There have also been employed in some cases systems in which the battery is charged directly from a generator regulated to constant potential, but this arrangement is open to the disadvantage that the current to the battery may be excessive or even disastrous to the plates of the battery when the battery is depleted, whereas when the battery approaches its fully charged condition the current supplied thereto will be insufficient to complete the charging operation.

According to the present invention the use of a lamp regulator is avoided by employing a generator regulated to constant potential independent of variations in train speed. Means are also provided for securing the effects of a constant current charge to the battery, since such a charge is most beneficial and enables the battery to be charged as rapidly as possible, which is of especial importance in car lighting service.

Briefly described, the object of the invention is attained by the use of a self-regulating booster in the battery charging circuit. This booster may be connected so as to be effective only during the charging period, being automatically made ineffective when the battery becomes fully charged or is carrying the lamp load, as it does if the train is running below the speed at which the generator will charge the battery; or the booster may be so connected that it will also add its voltage to that of the battery on discharge, correcting for drop in battery voltage.

Other objects and advantages of the invention will be apparent from a description of embodiments thereof, as illustrated in somewhat diagrammatic form in the accompanying drawings, in which—

Figure 1 represents a system in accordance with the present invention; and Fig. 2 represents a modification of certain features of the system shown in Fig. 1.

Referring to Fig. 1, 10 indicates the armature of an axle driven shunt generator, the field 11 of which has in series therewith a regulator resistance 12, the actuating coil 13 of which is connected in shunt to the generator thus providing for constant potential regulation of the latter. Any other form of voltage regulator may be employed. Main conductors 14 and 15 lead from the generator and in one of these is inserted the usual automatic switch 16 having a shunt winding connected across the main conductors and a series winding 18 adapted to be connected in circuit when the movable member 19 of the switch engages the fixed contacts 20. A unit 21 of high resistance is connected across the fixed contacts of the switch. This automatic switch may be of any desired construction in accordance with this invention, but it is provided with additional contacts as will hereinafter appear. Beyond the automatic switch, lamps or other translating devices 22 are connected between the main conductors 14 and 15. Beyond the lamps the main conductor 15 extends to one terminal of a battery 23, while the other main conductor 14 extends to an armature brush of an auxiliary generator or booster 24. From the other brush of the booster the main conductor passes through an ampere hour meter 25 to the other terminal of the battery 23. The booster is driven by a motor 26, and the fields of the booster and motor are indicated respectively at 27 and 28. Both of these fields are energized from the storage battery over conductor 29, normally closed relay contacts 30, conductor 31, switch 32 associated with the automatic switch 16, and conductor 33 to the other side of the battery. While shown connected in parallel, the fields may also be connected in series. Since the circuit of these fields is controlled by a contact on the automatic switch the fields will be deënergized when the automatic switch is open. The magnetic circuit of the booster should have its pole pieces slotted transversely to the direction of the flux so that while the voltage of the same may rise along a straight line with gradual increase in voltage of the battery the magnetic circuit however finally becomes saturated at or about the point of pronounced rise in battery voltage which occurs as the battery approaches its fully charged condition.

The circuit of relay coil 34 which controls switch 30 in the circuit of the booster and motor fields passes from a fixed contact 35 on the dial of the ampere hour meter 25, through the coil of a relay 36, and thence by conductor 37 to the main conductor 14. Adjacent the contact 35 on the meter is a second contact 38 which is connected by a conductor 39 to the main conductor 15. The pointer 40 of the ampere hour meter is adapted when the latter indicates that a full charge in ampere hours has been supplied to the battery to short circuit the contacts 35 and 38. In practice a switch actuated by the pointer of the meter may be used, but for convenience of illustration a simplified arrangement has been shown. Relay coil 36 which is in circuit with relay coil 34, has an armature 41 which forms the movable member of a switch for controlling the circuit of the motor armature. From one brush of the motor a conductor 42 leads to the main conductor 15 and the circuit of the motor armature is completed through the switch 41, conductor 43 to a switch 44 mounted upon the movable member of the automatic switch 16 and thence through a portion of conductor 37 to the main conductor 14. Switches 32 and 44 are so constructed that the former is closed slightly before the latter while its opening is somewhat delayed.

Connected to the bottom of the movable member of the automatic switch is an auxiliary switch 45 from the fixed terminals of which conductors 46 and 47 pass to opposite sides of the booster armature.

The operation of the system described above is as follows. When the train reaches such a speed that the voltage of the generator impressed upon the shunt coil 17 of the automatic switch is sufficient to cause the latter to lift the movable member 19 the main circuit to the battery will be established through this member. At the same time the fields of the booster and motor will be energized by the establishment of their circuit at the switch 32. On account of the construction of this switch its contacts will be closed before the circuit of the motor armature will be established at the switch 44. The switch 45 will at the same time be opened thus removing the short-circuit which until this time has existed about the armature of the booster. Under the action of the generator regulator the potential of the main generator will be maintained constant. If lamps are turned on they will then be supplied with current at constant potential and no lamp regulator will be necessary. The battery should be arranged of such number of cells that its normal open circuit voltage is equal to or slightly less than the constant potential developed by the generator. Since the field 27 of the booster is connected across the battery its excitation will increase as the voltage of the battery increases during charge and as the field excitation of the booster rises the voltage of its armature will rise correspondingly. The increase of booster voltage up to a certain predetermined point will therefore be equivalent to the rise of battery voltage and in consequence thereof a charging current of substantially constant value will be supplied to the storage battery.

It is, however, not desirable to charge a storage battery at the same rate when it approaches its fully charged condition, but the charging rate should be decreased as the battery begins to gas. When this occurs there is a pronounced rise of voltage of the battery and by causing the voltage impressed upon the terminals of the battery to increase at a lesser rate the charge to the battery will taper off, the amount of taper depending upon the relative increase of the battery and impressed voltages. It is to accomplish this result that the magnetic circuit of the booster is so designed that as it approaches the point of saturation there is substantially no further increase in the voltage of the booster and in consequence thereof the current flowing to the battery will be diminished as the voltage of the battery increases. With the decrease of charging rate to the battery the potential existing across its terminals will diminish, which will in turn again result in a decrease in the field current of the booster and a decrease in the voltage of its armature with a further decrease in the charging rate to the battery.

The field 28 of the motor 26 is also connected across the battery terminals, whereas its armature is connected across the terminals of the generator; thus the armature of the motor will be supplied by a current of constant potential, while its field will be energized by increasing current due to the rising potential of the battery. In consequence thereof when the battery voltage rises, as it does toward the end of charge, the motor speed will diminish because its field is made stronger. This decrease in the motor speed will occur at the same time that the field of the booster is approaching magnetic saturation and thus the decrease in the charging current caused by the voltage of the booster tending to remain constant is supplemented by the decrease in voltage of the booster caused by the decrease in speed of the motor. The voltage supplied by the booster will therefore decrease due to these two actions and a taper charge to the battery is made more certain.

It is a well known fact that the state of charge of a storage battery cannot be accurately determined by voltage indications alone, as these may vary widely from time to time depending upon temperature conditions, the condition of the plates of the battery, the condition of the electrolyte, and other factors. To insure that the battery may be fully charged regardless of its voltage condition and yet not be overcharged the ampere hour meter 25 has been provided. This meter may be of any well known integrating form arranged to have a slower rate on charge than on discharge, so as to correct for the inefficiency of the battery. When the indications of the meter show that the desired number of ampere hours has been supplied to the battery the pointer of the meter will short circuit the contact points 35 and 38, thus establishing the circuit of relay coil 34 which will open the circuit of the fields of the booster and motor and at the same time through the action of relay 36 will open the circuit of the armature of the motor. The booster will thus become ineffective to supply any further charging current to the battery and since the battery voltage is substantially equal to that of the main generator the battery will float upon the line. If at the time the ampere hour meter closes its contacts the voltage of the battery is below its normal full charge voltage, and the voltage of the main generator 10 is higher than the battery discharge voltage, current will flow into the battery to tend to bring it toward the fully charged condition. Although this current may be of small value it will, nevertheless, be useful in supplying a further charging current to the battery.

If at any time during the operation of charging the battery the train speed decreases so that the voltage of the main generator 10 falls below its normal value the automatic switch 16 will open, thus opening the circuit of the fields of both booster and motor as well as opening the armature circuit of the motor. At the same time, this switch will, through switch 45, establish a short-circuit about the armature of the booster, thus eliminating the resistance of this armature from the circuit between the battery and the lamps. As the normal voltage of the main generator 10 is substantially equal or only slightly greater than the normal voltage of the battery the voltage impressed upon the lamps when they are being supplied with current from the battery will differ but little from the voltage of the current supplied from the generator 10.

In case, however, it should be desired to take care of any such difference in voltage upon the lamp circuit or to compensate for the varying voltage of the battery while it is carrying the lamp load the modification of the system shown in Fig. 2 may be used. In this figure the constant potential generator, lamps, meter, battery, booster, motor and other elements are designated by the same reference characters as in Fig. 1, but the automatic switch 16 has no extra contacts 45.

In this modification of the invention the main conductor 14 after passing through the armature of the booster 24 has two branches, one of which includes a series winding 50 on the booster which is wound to oppose the shunt field 27 of the booster. The other branch of the main conductor leads to a contact 51 of a polarized relay 52 having its winding in the main circuit and its armature 53 connected to one terminal of this winding and also to one terminal of the series field. The armature when retracted engages a contact 54 which is connected to conductor 43 by means of a conductor 55. Attached to, but insulated from, armature 53 is a conducting bar 56 which in the retracted position of the armature short-circuits two contacts from which lead two conductors 57 and 58 to the main conductor 15 and one terminal of the switch 32 respectively. In order to provide for alteration of the effect of the series winding 50 an adjustable shunt 59 is placed about this winding.

The polarized relay 52 is so designed that when current flows through it from the generator to the battery the armature 53 will be attracted against contact 51 thus short-circuiting the series field of the booster. Under these conditions the system will operate as described in connection with Fig. 1. In Fig. 2 the fields 27 and 28 of the booster and motor respectively are shown connected in series, but they are controlled by the relay 34 and the switch 32 on the automatic switch just as in Fig. 1.

If the generator falls below the critical speed the automatic switch will open the main circuit and contacts 32 and 44 will also open to render the booster and motor ineffective provided no lamps are at this time in use. If, however, lamps are lit current will flow to them from the battery in a reverse direction through the polarized relay 52; the armature of the latter will then be thrown into contact with 54 thus removing the short-circuit about the series field 50 and establishing the fields 27 and 28 of the booster and motor respectively from one terminal of the battery 23, conductor 29, motor field 28, booster field 27, conductor 31, conductor 58, contact bar 56, conductor 57 to the other terminal of the battery. At the same time, the circuit of the motor armature will be completed from the main conductor 14 through the armature 53 of the polarized relay, contact 54, conductors 55 and 43, contact 41, armature of the motor, conductor 42 to the main conductor 15. The booster will thus be driven in the same direction as during the time when the main generator 10 is charging the battery. If the series winding of the booster predominates over the shunt winding the voltage of the booster will be added to that of the battery to make up for any difference at the lamps between the voltage of the main generator and the voltage of the battery when the lamp load is transferred from the generator to the battery. As the battery voltage decreases due to continued carrying of the lamp load the effect of the shunt field winding 27 of the booster decreases its opposition to the series winding 50 so that the latter will increase the voltage of the booster to compensate for the decreasing voltage of the battery. The series and shunt windings of the booster may be so related that the former may become predominant at any desired voltage of the battery or for any lamp load to reduce the electromotive force of the booster to zero or to produce a reverse current which shall aid that of the battery in supplying the lamps.

I claim:

1. The method of charging storage batteries which consists in impressing upon the terminals of the battery an electromotive force substantially equal to the normal voltage of the battery, superimposing upon said impressed electromotive force an electromotive force which increases as the voltage of the battery increases, reducing said superimposed electromotive force as the battery becomes fully charged and finally removing said superimposed electromotive force when a predetermined quantity of electricity has been supplied to the battery.

2. In a train lighting system, a generator, means for regulating the generator to a constant potential, a supply circuit extending from said generator, a storage battery and translating devices connected across said circuit, in combination with means for controlling the battery charge comprising an auxiliary generator having its armature connected in said supply circuit and its field connected across the battery and so designed that it will reach magnetic saturation as the battery becomes fully charged.

3. In a system for charging storage batteries, a generator, means for regulating the generator to a constant potential, a supply circuit extending from said generator, a storage battery connected across said circuit, in combination with means for controlling the battery charge comprising an auxiliary generator having its armature connected in said supply circuit and its field winding connected across the battery and its field so designed that it will reach magnetic saturation as the battery becomes fully charged, and means for driving said auxiliary generator at speeds varying inversely as the voltage of the storage battery.

4. A system for charging storage batteries, comprising, in combination, a generator, means for regulating the generator to a constant potential, a supply circuit extending from said generator, a storage battery connected to said supply circuit, and an auxiliary generator having its armature connected in said supply circuit and its field connected across the battery and so designed that it will reach magnetic saturation as the battery becomes fully charged.

5. A system for charging storage batteries, comprising, in combination, a generator, means for regulating the generator to a constant potential, a supply circuit extending from said generator, a storage battery connected to said supply circuit, an auxiliary generator having its armature connected in said supply circuit and its field connected across the battery and so designed that it will reach magnetic saturation as the battery becomes fully charged, and means for driving said auxiliary generator at speeds varying inversely as the voltage of the storage battery.

6. A system for charging storage batteries, comprising, in combination, a generator, means for regulating the generator to a constant potential, a supply circuit extending from said generator, a storage battery connected to said supply circuit, an auxiliary generator having its armature connected in said supply circuit and its field connected across the battery and so designed that it will reach magnetic saturation as the battery becomes fully charged, and means for rendering said auxiliary generator ineffective when a predetermined charge has been supplied to the battery.

7. A system for charging storage batteries, comprising, in combination, a generator, means for regulating the generator to a constant potential, a supply circuit extending from said generator, a storage battery connected to said supply circuit, an auxiliary generator having its armature connected in said supply circuit and its field connected across the battery and so designed that it will reach magnetic saturation as the battery becomes fully charged, means for driving said auxiliary generator at speeds varying inversely as the voltage of the storage battery, and means for rendering said auxiliary generator and said driving means ineffective when a predetermined charge has been supplied to the battery.

8. A system for charging storage batteries, comprising, in combination, a generator, means for regulating the generator to a constant potential, a supply circuit extending from said generator, a storage battery connected to said supply circuit, a booster having its armature connected to said supply circuit and its field connected across the battery and so designed that it will reach magnetic saturation as the battery becomes fully charged, and a motor for driving said booster at speeds varying inversely as the voltage of the storage battery.

9. A system for charging storage batteries, comprising, in combination, a generator, means for regulating the generator to a constant potential, a supply circuit extending from said generator, a storage battery and an ampere hour meter connected in said supply circuit, a booster having its armature connected in said supply circuit and its field connected across the battery, and means under the control of said meter for rendering said booster ineffective when the battery has been charged to a predetermined number of ampere hours.

10. A train lighting system comprising, in combination, a constant potential generator, a supply circuit leading therefrom, a storage battery and translating devices connected across said circuit, a booster having its armature connected in said circuit between the storage battery and the translating devices and its field connected across the battery and so designed that it will reach magnetic saturation as the battery becomes fully charged, and a motor for driving said auxiliary generator having its armature connected across said supply circuit between said booster armature and said generator and its field connected across said supply circuit between said booster armature and said battery.

11. A train lighting system comprising, in combination, a constant potential generator, a main circuit extending therefrom, an automatic switch in said main circuit, a storage battery and translating devices connected to said main circuit, an auxiliary generator having its armature connected in said main circuit between the translating devices and the battery and adapted to aid said generator when said automatic switch is closed, and means for reversing the direction of current from said armature to aid said battery in supplying current to said translating devices when said automatic switch is open.

12. A train lighting system, comprising, in combination, a constant potential generator, a main circuit extending from said generator, an automatic switch in the main circuit, translating devices and a storage battery connected to said main circuit, an auxiliary generator having its armature in said main circuit and with opposing shunt and series fields, means associated with said automatic switch for connecting the shunt field across the battery, a polarized relay in said main circuit, and means under the control of said polarized relay for rendering said series field ineffective when said automatic switch is closed and for establishing circuits through said series field and said shunt field when said automatic switch is open and translating devices are in use.

13. A train lighting system, comprising, in combination, a constant potential generator, a main circuit extending from said generator, an automatic switch in the main circuit, translating devices and a storage battery connected to said main circuit, an auxiliary generator having its armature in said main circuit and with opposing shunt and series fields, means associated with said automatic switch for connecting the shunt field across the battery, a polarized relay in said main circuit, means under the control of said polarized relay for rendering said series field ineffective when said automatic switch is closed and for establishing circuits through said series field and said shunt field when said automatic switch is open and translating devices are in use, means for driving said auxiliary generator, and means under the control of said automatic switch and said polarized relay for causing the operation of said driving means.

In testimony whereof I affix my signature.

MORTON ARENDT.